(12) United States Patent
Shoda (10) Patent No.: US 11,178,327 B2
(45) Date of Patent: Nov. 16, 2021

(54) ELECTRONIC APPARATUS, CONTROL METHOD FOR ELECTRONIC APPARATUS, AND NON-TRANSITORY COMPUTER READABLE MEDIUM

(71) Applicant: CANON KABUSHIKI KAISHA, Tokyo (JP)

(72) Inventor: Ryosuke Shoda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 62 days.

(21) Appl. No.: 16/391,648

(22) Filed: Apr. 23, 2019

(65) Prior Publication Data

US 2019/0335094 A1 Oct. 31, 2019

(30) Foreign Application Priority Data

Apr. 26, 2018 (JP) .............................. JP2018-084872

(51) Int. Cl.
*H04N 5/232* (2006.01)
*G06F 3/0484* (2013.01)

(52) U.S. Cl.
CPC ..... *H04N 5/23216* (2013.01); *G06F 3/04847* (2013.01)

(58) Field of Classification Search
CPC ....................... H04N 5/23216; G06F 3/04847
See application file for complete search history.

(56) References Cited

U.S. PATENT DOCUMENTS

2016/0227105 A1* 8/2016 Kobayashi .......... G06F 3/04847

FOREIGN PATENT DOCUMENTS

JP 2006-260544 A 9/2006

* cited by examiner

*Primary Examiner* — Twyler L Haskins
*Assistant Examiner* — Fayez A Bhuiyan
(74) *Attorney, Agent, or Firm* — Cowan, Liebowitz & Latman, P.C.

(57) ABSTRACT

An electronic apparatus includes: a first operation member provided on a first surface; a second operation member provided on a second surface; a first display provided on the first surface; a second display provided on the second surface; and a memory and at least one processor and/or at least one circuit to perform the operations of: a control unit configured to control so as to, in response to a display instruction of a guide display indicating functions assigned to operation members, cause the first display to perform display indicating at least a function assigned to the first operation member, and cause the second display to perform display indicating a function assigned to the second operation member.

13 Claims, 10 Drawing Sheets

| ASSIGNMENT | SHUTTER BUTTON IS HALF-PRESSED | AE LOCK BUTTON | M-Fn BUTTON | MOVING IMAGE BUTTON | ENLARGEMENT BUTTON |
|---|---|---|---|---|---|
| ASSIGNMENT 1 | PHOTOMETRY/AF START | AE LOCK/FE LOCK | ISO SENSITIVITY | MOVING IMAGE RECORDING START/END | ENLARGEMENT |
| ASSIGNMENT 2 | PHOTOMETRY START | PHOTOMETRY/AF START | MOVING IMAGE RECORDING START/END | ISO SENSITIVITY | MOVING IMAGE RECORDING START/END |
| ASSIGNMENT 3 | AE LOCK | AF STOP | STROBE LIGHT FLASH | STROBE LIGHT FLASH | ISO SENSITIVITY |
| ASSIGNMENT 4 | | AE LOCK | EXPOSURE CORRECTION | EXPOSURE CORRECTION | STROBE LIGHT FLASH |
| ASSIGNMENT 5 | | FE LOCK | MF | MF | EXPOSURE CORRECTION |
| ASSIGNMENT 6 | | INEFFECTIVE STATE | RECORDING IMAGE QUALITY SWITCH | RECORDING IMAGE QUALITY SWITCH | MF |
| ASSIGNMENT 7 | | | ENLARGEMENT | ENLARGEMENT | RECORDING IMAGE QUALITY SWITCH |
| ASSIGNMENT 8 | | | PHOTOMETRY MODE | PHOTOMETRY MODE | PHOTOMETRY MODE |
| ASSIGNMENT 9 | | | WHITE BALANCE | WHITE BALANCE | WHITE BALANCE |
| ASSIGNMENT 10 | | | INEFFECTIVE STATE | INEFFECTIVE STATE | INEFFECTIVE STATE |

ELECTRONIC APPARATUS, CONTROL METHOD FOR ELECTRONIC APPARATUS, AND NON-TRANSITORY COMPUTER READABLE MEDIUM

This application claims the benefit of Japanese Patent Application No. 2018-084872, filed on Apr. 26, 2018, which is hereby incorporated by reference herein in its entirety.

BACKGROUND OF THE INVENTION

Field of the Invention

The present invention relates to an electronic apparatus, a control method for an electronic apparatus, and a non-transitory computer readable medium, and more particularly, to a guide display of a function assigned to an operation member in an electronic apparatus having operation members on a plurality of surfaces.

Description of the Related Art

Many electronic apparatuses having customization keys for which the assigned functions can be changed are known. The number of functions installed in an electronic apparatus is increasing year by year. The number of functions that users want to assign as customization keys also increases year by year, and the number of customization keys is also increasing. Since it is difficult for the user to remember which function shortcut is assigned to which customization key, it is desirable to install a function making it possible to display a list of functions assigned to the customization keys on the electronic apparatus, so that the user could easily check the list. For example, an information processing apparatus disclosed in Japanese Patent Application Publication No. 2006-260544 displays the customization key corresponding to the registered function at the timing when the user uses the customization key.

SUMMARY OF THE INVENTION

However, even with the technique disclosed in Japanese Patent Application Publication No. 2006-260544, when an assignment status of a customization key on a surface different from the surface on which the display unit is present, among a plurality of surfaces of the electronic apparatus, is checked on the display unit, the user may not be able to check easily the assignment status. Specifically, where the user got used to the operation of the electronic apparatus and does not remember the key arrangement (button arrangement), the user has to look at the operation surface on which the customization keys are provided every time the assignment status is checked, which is inconvenient. Further, the user can sometimes wish to check the function assigned not only to a customization key, but also to an operation member to which a function that cannot be customized has been assigned in advanced, and the above-mentioned problem is also applicable to this case. Even when the user cannot customize, depending on the operation mode, different functions may be assigned to the same operation member, and in such a case, the user will be required to check the function assigned to the operation member.

The present invention provides an electronic apparatus, a control method for an electronic apparatus, and a non-transitory computer readable medium which enable a user to check easily the assignment status of a plurality of operation members arranged on different surfaces of the apparatus.

An electronic apparatus according to the present invention includes: a first operation member provided on a first surface; a second operation member provided on a second surface; a first display provided on the first surface; a second display provided on the second surface; and a memory and at least one processor and/or at least one circuit to perform the operations of: a control unit configured to control so as to, in response to a display instruction of a guide display indicating functions assigned to operation members, cause the first display to perform display indicating at least a function assigned to the first operation member, and cause the second display to perform display indicating a function assigned to the second operation member.

According to the present invention, it becomes easier for the user to check the assignment status of a plurality of operation members arranged on different surfaces of the apparatus.

Further features of the present invention will become apparent from the following description of exemplary embodiments with reference to the attached drawings.

DESCRIPTION OF THE EMBODIMENTS

Figure 1A:
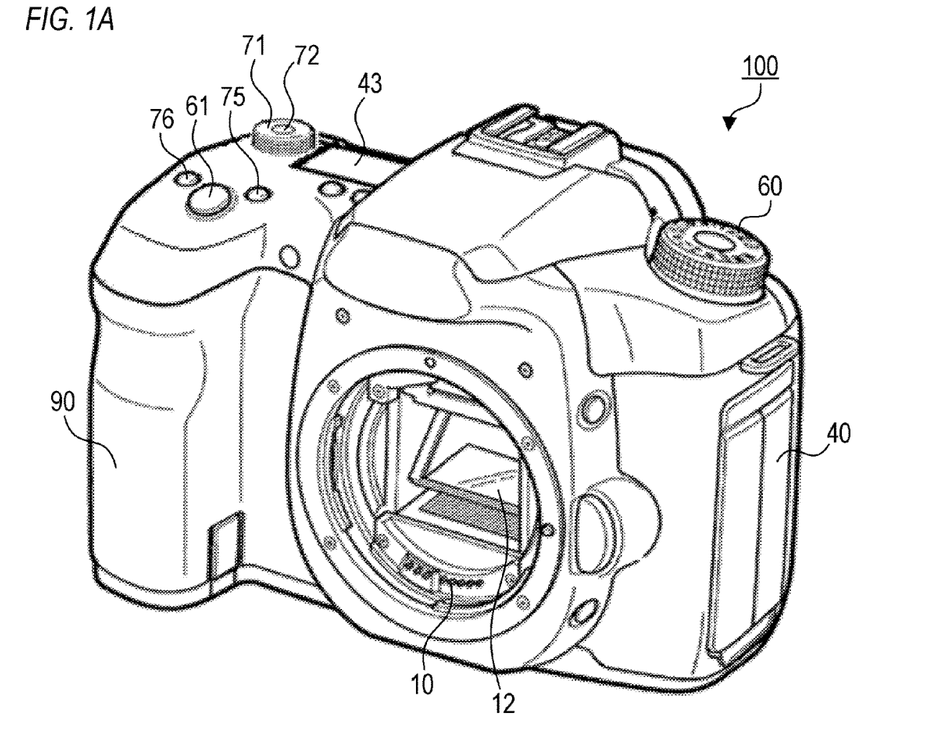
FIGS. 1A and 1B are external views of a digital camera according to the present embodiment.
Figure 1B:
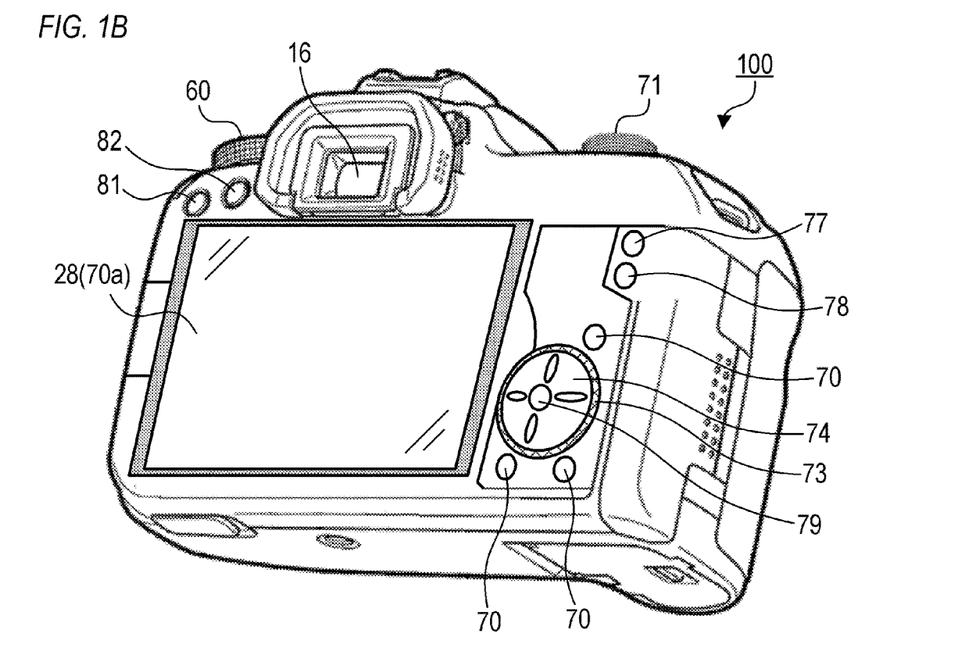

Preferred embodiments of the present invention will be described below with reference to the drawings. FIGS. 1A and 1B are external views of a digital camera 100 as an example of an apparatus to which the present invention can be applied. FIG. 1A is a front perspective view of the digital camera 100, and FIG. 1B is a rear perspective view of the digital camera 100.

A back-surface display unit 28 is a display unit provided on the back surface of the digital camera 100, and displays images and various kinds of information. The back-surface display unit 28 may be configured of a variable-angle monitor capable of changing the orientation with respect to a main body portion. However, as shown in FIG. 1A, it is assumed that the display surface of the back-surface display unit 28 can face the side opposite to the object which is to be imaged. An upper-surface display unit 43 is a display unit provided on the upper surface of the digital camera 100, and displays various setting values of the digital camera 100 including a shutter speed and an aperture. A terminal cover 40 protects a connector (not shown) such as a connection cable for connecting the digital camera 100 to an external apparatus. A quick return mirror 12 is instructed from a system control unit 50 (described later) and moved up and down by an actuator (not shown). A communication terminal 10 allows the digital camera 100 to communicate with a lens unit 150 (described later; removable) side. An eyepiece finder 16 is a looking-in type finder for checking the focus and composition of the optical image of the object, which is obtained through the lens unit 150, by observing a focusing screen 13 (described later). A grip portion 90 is a holding portion which is shaped so as to be easily gripped by the right hand when the user holds the digital camera 100.

Further, the digital camera 100 has a plurality of operation units (operation members) 70. The plurality of operation units 70 include a mode changeover switch 60, a shutter button 61, a main electronic dial 71, a power supply switch 72, a sub electronic dial 73, a four-direction key 74, an M-Fn button 75, and a moving image button 76. The plurality of operation units 70 also include a reduction button 77, an enlargement button 78, a SET button 79, a menu button 81, and a playback button 82. The digital camera 100 may have other operation members. Each operation member will be described hereinbelow.

Figure 2:
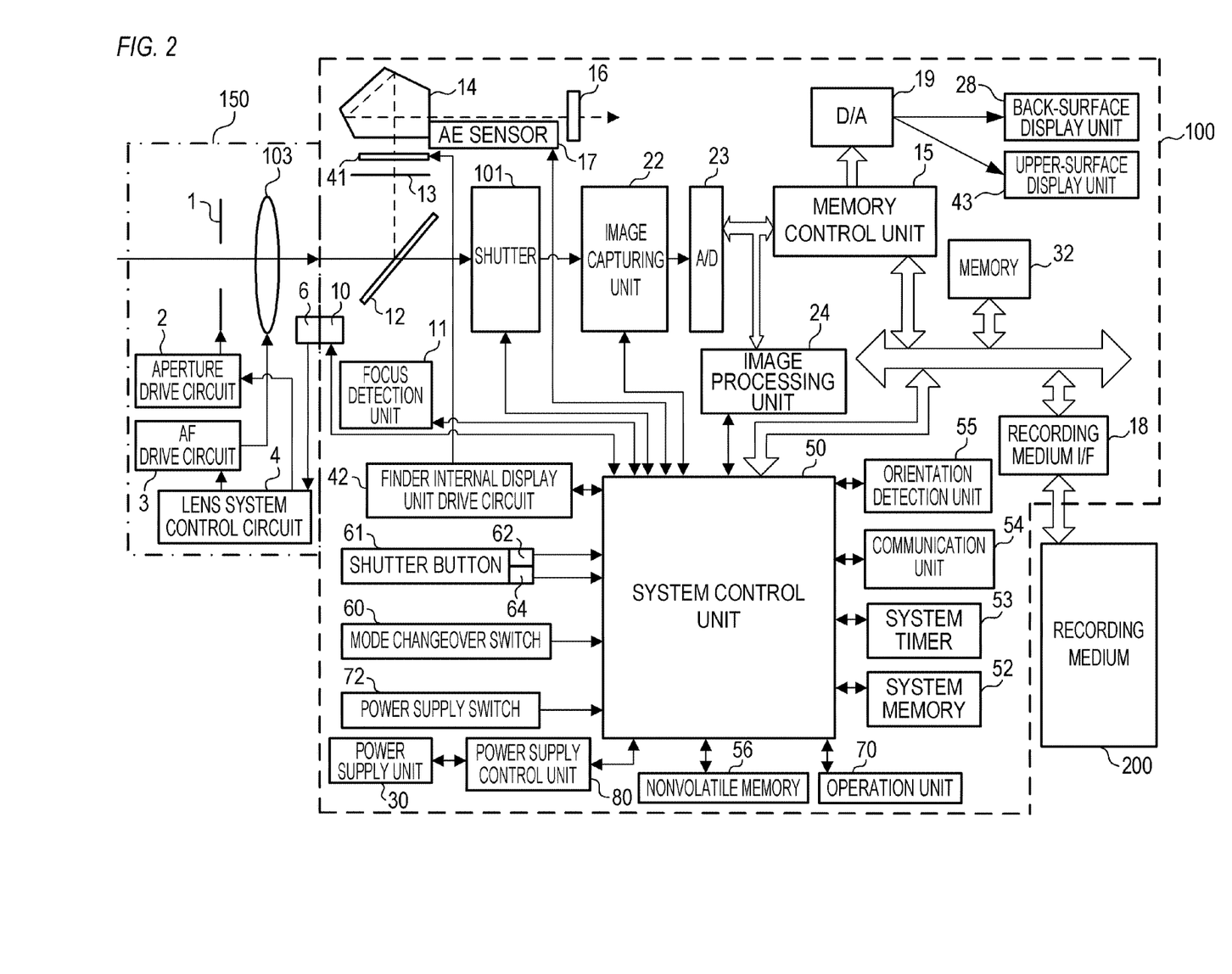
FIG. 2 is a block diagram of the digital camera according to the present embodiment.

FIG. 2 is a block diagram showing a configuration example of the digital camera 100.

A lens unit 150 is for installing exchangeable photographing lenses. Normally, a lens 103 is composed of a plurality of lenses, but in FIG. 2, only one lens is shown for simplicity. A communication terminal 6 allows the lens unit 150 to communicate with the digital camera 100 side, and the communication terminal 10 allows the digital camera 100 to communicate with the lens unit 150 side. The lens unit 150 communicates with the system control unit 50 via the communication terminals 6 and 10. Further, the lens unit 150 controls the aperture 1 via an aperture drive circuit 2 by a lens system control circuit 4 located thereinside. In addition, the lens unit 150 is focused by shifting the position of the lens 103 via an AF drive circuit 3 by the lens system control circuit 4.

An AE (automatic exposure) sensor 17 measures the brightness of the object (object light) passed through the lens unit 150.

A focus detection unit 11 outputs defocus amount information to the system control unit 50. The system control unit 50 controls the lens unit 150 on the basis of the defocus amount information and performs a phase difference AF.

The quick return mirror 12 (hereinafter, the mirror 12) is instructed from the system control unit 50 at the time of exposure, live view image capturing, moving image capturing or the like, and is moved up and down by an actuator (not shown). The mirror 12 is for switching the light flux incident from the lens 103 between the finder 16 side and the image capturing unit 22 side. Normally, the mirror 12 is arranged to guide (reflect) the light flux to the finder 16 (mirror down), but in the case of image capturing or live view display, the mirror is raised and retreated from the light flux (mirror up) so that the light beam is guided to the image capturing unit 22. The central portion of the mirror 12 is a half mirror so that a part of the light can pass therethrough, and a part of the light flux is transmitted so as to be incident on the focus detection unit 11 for focus detection.

By observing the focusing screen 13 via the pentaprism 14 and the finder 16, the photographer can check the focus and composition of the optical image of the object obtained through the lens unit 150.

A shutter 101 is a focal plane shutter that can freely control the exposure time of the image capturing unit 22 under the control by the system control unit 50.

The image capturing unit 22 is an image capturing element (an image sensor) composed of a CCD, a CMOS sensor or the like for converting an optical image into an electric signal. An A/D converter 23 converts the analog signal outputted from the image capturing unit 22 into a digital signal.

The image processing unit 24 performs predetermined processing (resizing processing such as pixel interpolation and reduction, color conversion processing, and the like) on data from the A/D converter 23 or data from a memory control unit 15. In the image processing unit 24, predetermined calculation processing is performed using the captured image data, and the system control unit 50 performs exposure control and distance measurement control on the basis of the obtained calculation result. AF (auto focus) processing, AE processing, EF (flash pre-light emission) processing, and the like of the TTL (through-the-lens) system are thus performed. In the image processing unit 24, predetermined calculation processing is also performed using the captured image data, and AWB (auto white balance) processing of the TTL (through-the-lens) system is also performed based on the obtained calculation result.

The output data from the A/D converter 23 are directly written in a memory 32 via the image processing unit 24 and the memory control unit 15, or via the memory control unit 15. The memory 32 stores image data obtained by the image capturing unit 22 and converted into digital data by the A/D converter 23 and image data to be displayed on the back-surface display unit 28. The memory 32 has sufficient storage capacity to store a predetermined number of still images, or moving images and sounds for a predetermined time.

The memory 32 also serves as a memory (video memory) for displaying an image. The D/A converter 19 converts the image display data stored in the memory 32 into an analog signal and supplies the analog signal to the back-surface display unit 28. In this way, the image data for display which have been written in the memory 32 are displayed on the back-surface display unit 28 via the D/A converter 19. The back-surface display unit 28 performs display according to the analog signal from the D/A converter 19 on the display device such as an LCD. The digital signal A/D-converted by the A/D converter 23 and stored in the memory 32 is D/A converted by the D/A converter 19 and successively transferred to the back-surface display unit 28 for display, thereby making it possible to realize an electronic viewfinder function and performing through image display (live view display). Hereinafter, the image displayed in the live view display will be referred to as "LV image".

In a finder internal display unit 41, a frame (AF frame) indicating the distance measuring point which is currently being autofocused, an icon indicating the setting state of the camera, and the like are displayed via a finder internal display unit drive circuit 42.

Various setting values of the digital camera 100 including the shutter speed and the aperture are displayed on the upper-surface display unit 43. The upper-surface display unit 43 is a dot matrix liquid crystal display unit and is a nonvolatile display unit capable of maintaining the display state even when the power supply (main power supply) of the digital camera 100 is off. The back-surface display unit 28 is capable of color display of three or more colors, whereas the upper-surface display unit 43 is capable of monochrome display of only two colors: black and white. In addition, the resolution (number of dots; number of pixels) of the upper-surface display unit 43 is lower than that of the back-surface display unit 28, the upper-surface display unit 43 cannot perform the display as highly detailed as that of the back-surface display unit 28, and the amount information that can be displayed on the upper-surface display unit 43 is smaller than that of the back-surface display unit 28.

The nonvolatile memory 56 is an electrically erasable/recordable memory, for example, an EEPROM or the like. In the nonvolatile memory 56, constants, programs and the like for operation of the system control unit 50 are stored. The program referred to herein is for executing various flowcharts described later in the present embodiment.

The system control unit 50 includes at least one processor or circuit, and controls the entire digital camera 100. By executing the program recorded in the nonvolatile memory 56, the system control unit 50 realizes each process of the present embodiment to be described later. The system memory 52 is, for example, a RAM, and the system control unit 50 expands constants and variables for operation of the system control unit 50, programs read from the nonvolatile memory 56, and the like in the system memory 52. The system control unit 50 also controls display by controlling the memory 32, the D/A converter 19, the back-surface display unit 28, the upper-surface display unit 43, and the like.

The system timer 53 is a time measuring unit that measures time used for various controls and time of a built-in clock.

The power supply control unit 80 includes a battery detection circuit, a DC-DC converter, a switch circuit for switching blocks to be energized, and the like, and detects the presence or absence of a battery attached, the type of battery, and the remaining battery level. In addition, the power supply control unit 80 controls the DC-DC converter on the basis of the detection results and the instruction from the system control unit 50, and supplies a necessary voltage to each unit including the recording medium 200 for a necessary period. The power supply unit 30 is configured of a primary battery such as an alkaline battery and a lithium battery, a secondary battery such as a NiCd battery, a NiMH battery, and a Li battery, an AC adapter, and the like.

The recording medium I/F 18 is an interface with a recording medium 200 such as a memory card or a hard disk. The recording medium 200 is a recording medium such as a memory card for recording a captured image and is configured of a semiconductor memory, a magnetic disk, or the like.

The communication unit 54 transmits and receives a video signal and an audio signal to and from an external apparatus connected wirelessly or via a wire cable. The communication unit 54 can also connect to a wireless LAN (Local Area Network) and the Internet. In addition, the communication unit 54 can also communicate with an external apparatus by Bluetooth (registered trademark) or Bluetooth Low Energy. The communication unit 54 can transmit images (including LV images) captured by the image capturing unit 22 and images recorded on the recording medium 200, and can receive image data and various other information from an external apparatus.

The orientation detection unit 55 detects the orientation of the digital camera 100 with respect to the direction of gravity. On the basis of the orientation detected by the orientation detection unit 55, it can be determined whether the image captured by the image capturing unit 22 is an image captured with the digital camera 100 held horizontally, or whether it is an image captured with the digital camera held vertically. The system control unit 50 can add orientation information corresponding to the orientation detected by the orientation detection unit 55 to an image file of the image (captured image) captured by the image capturing unit 22, or can rotate and record the image. An acceleration sensor, a gyro sensor, or the like can be used as the orientation detection unit 55. It is also possible to detect the movement (pan, tilt, lifting, stationary or not, etc.) of the digital camera 100 by using an acceleration sensor or a gyro sensor which is the orientation detection unit 55.

The operation unit 70 is an input unit that receives an operation (user operation) from the user, and is used to input various operation instructions to the system control unit 50. For example, the operation unit 70 is a push button, a rotary dial, a touch sensor, or the like. As described above, the digital camera 100 has a plurality of operation units 70, and the operation units 70 include a mode changeover switch 60, a shutter button 61, a main electronic dial 71, a power supply switch 72, a sub electronic dial 73, and a four-direction key 74. The plurality of operation units 70 also include an M-Fn button 75, a moving image button 76, a reduction button 77, an enlargement button 78, a SET button 79, a menu button 81, and a playback button 82. Each operation member as the operation unit 70 is appropriately assigned with a function for each scene by selectively operating various function icons displayed on the back-surface display unit 28, and acts as a respective function button. Examples of the function button include an end button, a return button, an image advance button, a jump button, a narrowing down button, an attribute change button, and the like. For example, when the menu button 81 is pressed, a menu screen allowing various settings is displayed on the back-surface display unit 28. The user can intuitively make various settings by using the menu screen displayed on the back-surface display unit 28 and the four-direction key (four-direction button) 74 and the SET button 79.

The mode changeover switch 60 is an operation member for switching various modes. The mode changeover switch 60 switches the operation mode of the system control unit 50 to one of a still image recording mode, a moving image capturing mode, a reproduction mode, and the like. The modes included in the still image recording mode include an auto image capturing mode, an auto scene discrimination mode, a manual mode, an aperture priority mode (Av mode), a shutter speed priority mode (Tv mode), and a program AE mode. Also, there are various scene modes, custom modes, and the like which are image capturing settings for each image capturing scene. The mode changeover switch 60 enables the user to switch directly to any one of these modes. Alternatively, after switching once to the list screen of image capturing modes with the mode changeover switch 60, it is possible to selectively switch to any one of the plurality of displayed modes by using another operation member. Similarly, a plurality of modes may be included in the moving image capturing mode.

The shutter button 61 is an operation member for issuing an image capturing instruction. The shutter button 61 includes a first shutter switch 62 and a second shutter switch 64. During the operation of the shutter button 61, the first shutter switch 62 is turned ON by the so-called half-pressing (image capturing preparation instruction), and generates a first shutter switch signal SW1. The system control unit 50 starts operations such as AF processing, AE processing, AWB processing, EF processing, and the like with the first shutter switch signal SW1. The second shutter switch 64 is turned ON by the completion of the operation of the shutter button 61, that is, the so-called full-pressing (image capturing instruction), and generates a second shutter switch signal SW2. The system control unit 50 starts a series of image capturing processing operations from the reading of the signal from the image capturing unit 22 to the writing of the image data to the recording medium 200 with the second shutter switch signal SW2.

The main electronic dial 71 is a rotation operation member, and by rotating the main electronic dial 71, it is possible to change the setting values such as the shutter speed and aperture. The power supply switch 72 is an operation member for ON/OFF switching the power supply of the digital camera 100. The sub electronic dial 73 is a rotation operation member, and by rotating the sub electronic dial 73, it is possible to move the selection frame and feed images. The four-direction key 74 is configured to enable pushing of the upper, lower, left, and right parts. It is possible to perform processing in accordance with the portion pressed by the four-direction key 74.

The reduction button 77 is for reducing the enlargement ratio of the enlarged reproduction image and reducing the displayed image. When there is no enlargement in the image capturing mode, the reduction button functions as an AE lock button for fixing the exposure at the current exposure. The enlargement button 78 is an operation button for ON/OFF switching the enlargement mode and changing the enlargement ratio in the enlargement mode in the live view display (LV display) in the image capturing mode. In the reproduction mode, the enlargement button 78 functions for enlarging the reproduction image or increasing the enlargement ratio thereof.

The M-Fn button 75 is dedicated to customization, and by pressing the M-Fn button 75, it is possible to perform a shortcut to the function registered by the user. The moving image button 76 is for starting/ending recording of a moving image. The SET button 79 is used for a determination operation or the like in the selected item. The menu button 81 is for displaying a setting menu screen of the digital camera 100 related to image capturing and reproduction. The playback button 82 is for switching between the image capturing mode and the playback mode. By pressing the playback button 82 during the image capturing mode, it is possible to shift to the playback mode to display the latest image among the images recorded on the recording medium 200 on the back-surface display unit 28.

The user can assign a desired function to the M-Fn button 75 or customize the function of the M-Fn button 75 to another function by the customization function of the digital camera 100. In addition, the user can customize the functions of the moving image button 76, the enlargement button 78, the AE lock button 77, and the first shutter switch 62 (the shutter button 61 is half-pressed) to a function different from the above function by the customization function. In the present embodiment, it is assumed that the shutter button 61, the M-Fn button 75, and the moving image button 76 are arranged on the upper surface of the digital camera 100, like the upper-surface display unit 43. Further, the enlargement button 78 and the AE lock button 77 are assumed to be arranged on the back surface of the digital camera 100, like the back-surface display unit 28. These operation members for which the assigned function can be changed are referred to as "customization keys".

As shown in FIG. 1, the plurality of operation units 70 may include a touch panel 70a capable of detecting a touch (touch operation) on the back-surface display unit 28. The touch panel 70a and the back-surface display unit 28 can be formed integrally.

Figure 3A:
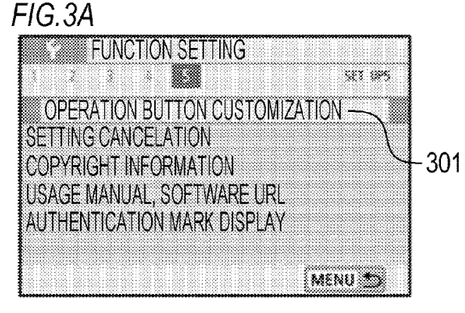
FIGS. 3A to 3G are screen examples of the back-surface display unit according to the present embodiment.

Next, customization of customization key assignment will be described with reference to FIGS. 3A to 3G The customization starts from the menu display state in which the menu screen in FIG. 3A is displayed on the back-surface display unit 28 by pressing the menu button 81.

When the SET button 79 is pressed in a state in which a cursor 301 is aligned with the top option "OPERATION BUTTON CUSTOMIZATION" on the menu screen in FIG. 3A, the option "OPERATION BUTTON CUSTOMIZATION" is selected. When the option "OPERATION BUTTON CUSTOMIZATION" is selected, the display screen of the back-surface display unit 28 changes from the menu screen in FIG. 3A to the key selection screen in FIG. 3B. On the key selection screen in FIG. 3B, a list of customization keys and functions currently assigned is displayed. Therefore, pressing the SET button 79 in a state where the cursor 301 is placed on the option "OPERATION BUTTON CUSTOMIZATION" can also be said to be a display instruction of a guide display a guide display instruction, and the like indicating the function assigned to the customization key.

Figure 3B:
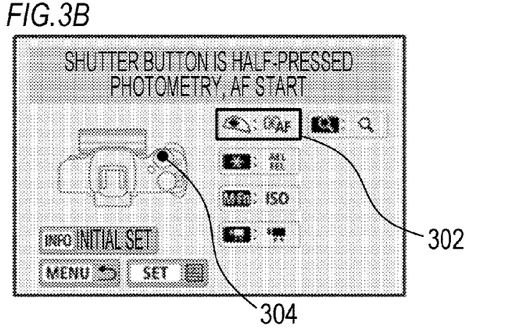

The cursor 302 in FIG. 3B represents the position of the item selected as the customization key for which the assignment is desired to be changed, and in FIG. 3B, the cursor 302 is positioned at the item representing the first shutter switch 62 (the shutter button 61 is half-pressed). By operating the sub electronic dial 73 or the four-direction key 74 on the key selection screen, it is possible to move the cursor 302 and select another item (customization key option) as the customization key for which the assignment is to be changed. Therefore, the operation of the sub electronic dial 73 and the four-direction key 74 for moving the cursor 302 can be also said to be a key selection instruction for selecting any one of a plurality of customization keys. On the left side of the key selection screen, an external view showing the position (arrangement) of the customization key indicated by the selected item is displayed.

When an item corresponding to any one of the first shutter switch 62, the M-Fn button 75, and the moving image button 76, which are customization keys arranged on the upper surface, is selected on the key selection screen, an external view of the upper surface of the digital camera 100 is displayed. Then, in the displayed external view, a mark 304 is displayed at the position of the customization key corresponding to the item selected by the cursor 302, and the user is easily notified of which customization key has been selected. In FIG. 3B, the first shutter switch 62 (the shutter button 61 is half-pressed) arranged on the upper surface is selected. Therefore, the external view of the upper surface is displayed, and the mark 304 is displayed at the position of the first shutter switch 62 (shutter button 61) in the external view. With the mark 304, the currently selected customization key can be identified with a color different from that of other customization keys in the external view displayed on the key selection screen.

Figure 3C:
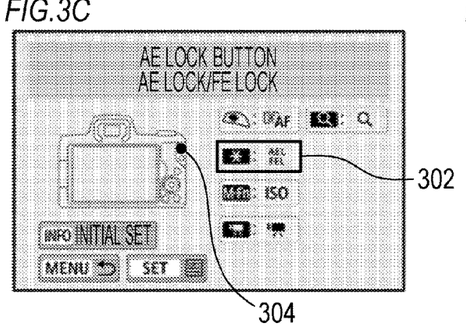

When an item corresponding to the enlargement button 78 or the AE lock button 77 which is a customization key arranged on the back surface is selected on the key selection screen, an external view of the back surface of the digital camera 100 is displayed. FIG. 3C shows a state in which the cursor 302 is moved on the key selection screen and the cursor 302 is placed on the item (customization key option) representing the AE lock button 77. In FIG. 3C, since the AE lock button 77 arranged on the back surface is selected, the external view to be displayed is the external view of the back surface, and the mark 304 is displayed at the position of the AE lock button 77 in the external view.

By pressing the SET button 79 in a state where the item (customization key option) has been selected with the cursor 302, the customization key corresponding to the item selected by the cursor 302 is determined as the change target of the assigned function. Therefore, pressing the SET button 79 in the state where the item has been selected with the cursor 302 can be said to be a target key determination instruction for determining the customization key to be the change target of the assigned function. For example, by depressing the SET button 79 in the state shown in FIG. 3C, the AE lock button 77 is determined as an assignment change target and the display screen of the back-surface display unit 28 is changed from the key selection screen in FIG. 3C by the function selection screen in FIG. 3D.

Figure 3D:
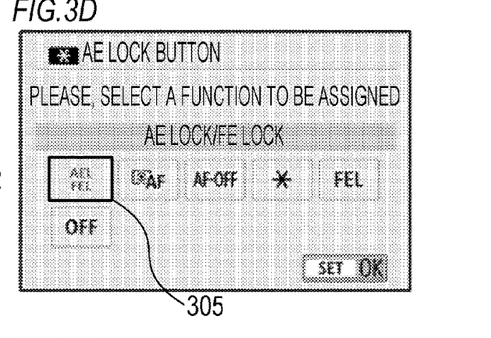

On the function selection screen in FIG. 3D, a list of functions that can be assigned to the AE lock button 77 is displayed, and a function to be assigned to the AE lock button 77 can be selected from the list. Since the AE lock/FE lock function has been assigned in the initial state, the cursor 305 is at a position of the item corresponding to the AE lock/FE lock function among the plurality of items (a plurality of options respectively corresponding to a plurality of functions).

By operating the sub electronic dial 73 or the four-direction key 74 on the function selection screen, it is possible to change the position of the cursor 305 and select (preliminarily determine) the function which is wished to be assigned. Then, by pressing the SET button 79 in a state where the item (function option) has been selected with the cursor 305, it is possible to fix (main determination) the function corresponding to the item selected by the cursor 305 as the function of the customization key which is the change target. Therefore, the operation of the sub electronic dial 73 and the four-direction key 74 for moving the cursor 305 can also be said to be a function selection instruction for selecting a function which is wished to be assigned. The pressing of the SET button 79 in the state where the item has been selected by the cursor 305 can also be said to be an assignment fixing instruction for fixing the assignment of the function.

Figure 3E:
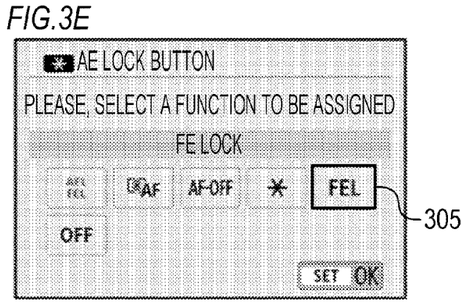
Figure 3F:
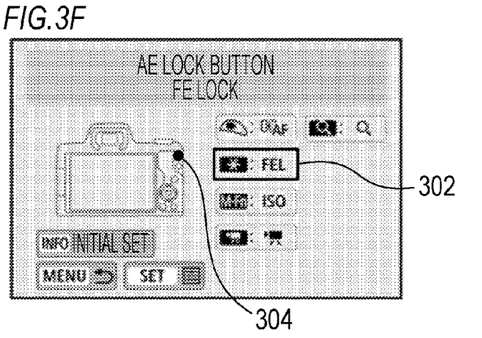

For example, by operating the sub electronic dial 73 or the four-direction key 74, it is possible to move the cursor 305 to the item of the FE lock function as shown in FIG. 3E. When the SET button 79 is pressed in the state shown in FIG. 3E, the display screen of the back-surface display unit 28 is changed from the function selection screen in FIG. 3E to the key selection screen in FIG. 3F, and the FE lock function is assigned to the AE lock button 77. On the key selection screen in FIG. 3F, the function represented by the item of the AE lock button 77 is changed to the FE lock function (change of the icon).

In this manner, the user can change the assignment of functions of the first shutter switch 62, the M-Fn button 75, the moving image button 76, the AE lock button 77, and the enlargement button 78 according to his/her image capturing style and preference.

Figure 3G:
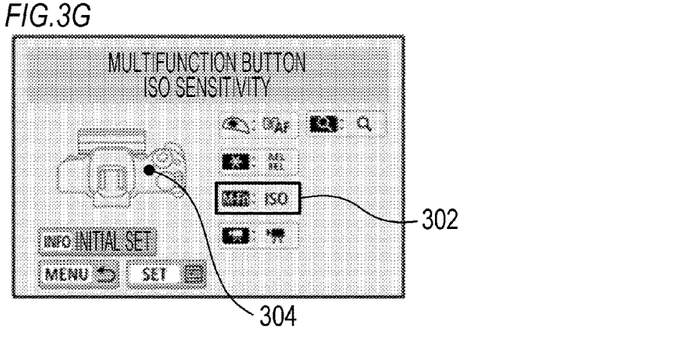

FIG. 3G shows a state in which the cursor 302 is moved on the key selection screen and the cursor 302 is placed on the item (customization key optional) representing the M-Fn button 75. In FIG. 3G since the M-Fn button 75 arranged on the upper surface is selected, the external view to be displayed is the external view of the upper surface, and the mark 304 is displayed at the position of the M-Fn button 75 in the external view.

Figure 4:
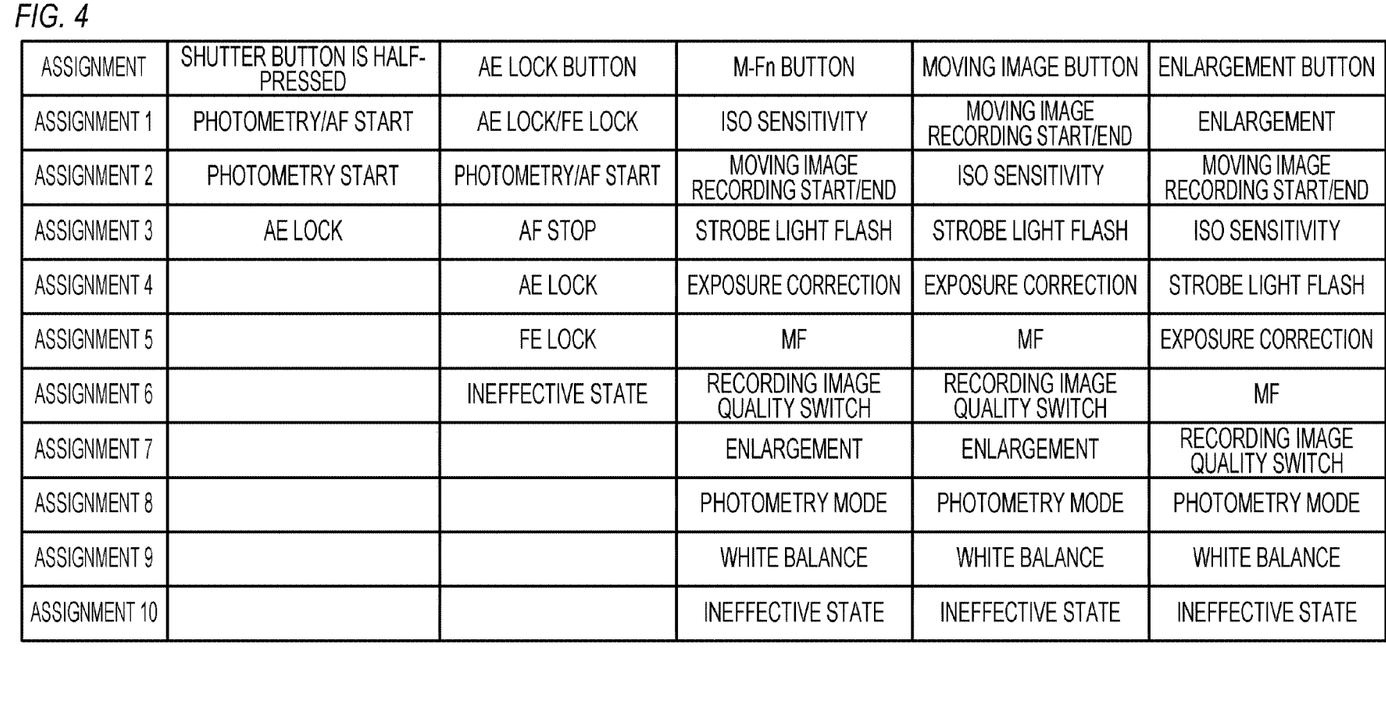
FIG. 4 is a list of functions that can be assigned to the customization keys according to the present embodiment.

FIG. 4 exemplifies a list of functions that can be assigned to each customization key. In the example shown in FIG. 4, any one of the photometry/AF start function, photometry start function, and AE lock function can be assigned to the first shutter switch 62 (the shutter button 61 is half-pressed). Any one of the AE lock/FE lock function, photometry/AF start function, AF stop function, AE lock function, FE lock function, and ineffective state (state without function assignment) can be assigned to the AE lock button 77. Any one of the ISO sensitivity function, moving image recording start/end function, strobe light emission function, exposure correction function, MF function, recording image quality switching function, enlargement function, photometry mode function, white balance function and ineffective state can be assigned to the M-Fn button 75. The functions that can be assigned to the moving image button 76 and the enlargement button 78 are the same as the functions that can be assigned to the M-Fn button 75.

Figure 5:
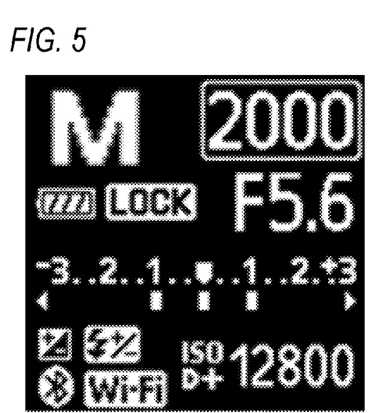
FIG. 5 is a screen example of the upper-surface display unit according to the present embodiment.

Next, referring to FIG. 5, the upper-surface display unit 43 will be described. The upper-surface display unit 43 is attached to the upper surface of the digital camera 100 and displays setting information of the digital camera 100. FIG. 5 shows an example of the screen in the image capturing standby state, and basic information of image capturing such as Tv, Av, exposure correction, and ISO is displayed on the screen.

Figure 6A:
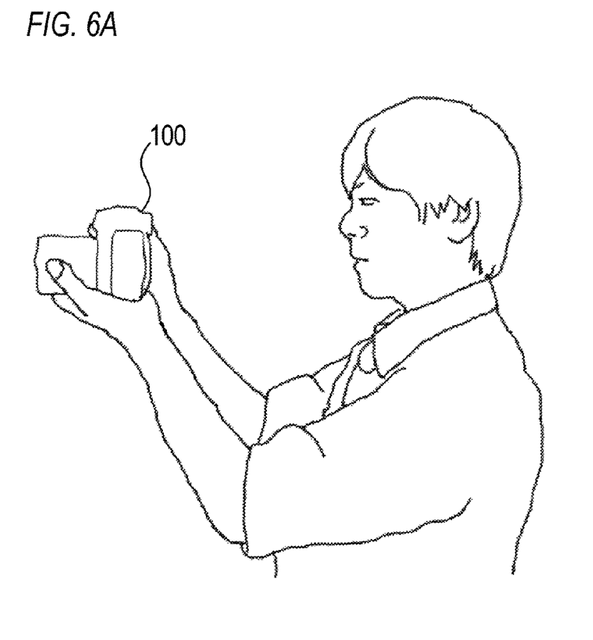
FIGS. 6A and 6B are examples of orientation of a user viewing the digital camera according to the present embodiment.
Figure 6B:
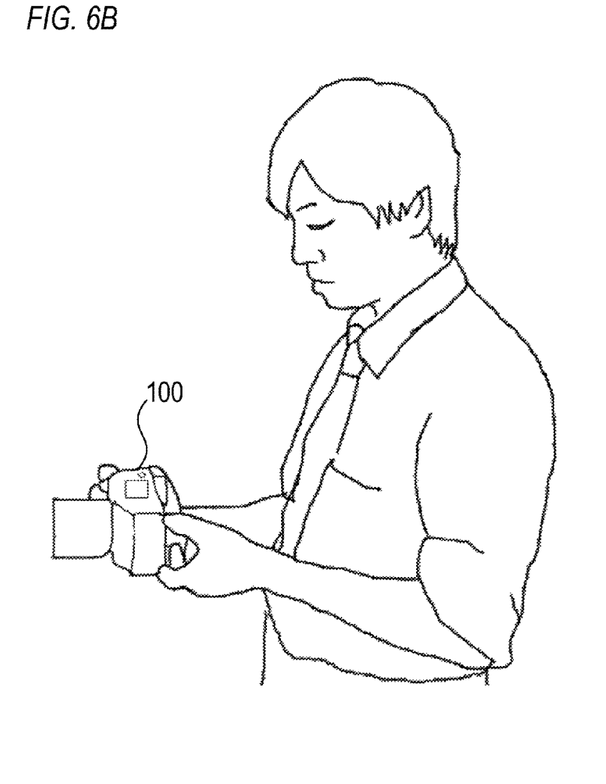

Next, the problem to be solved in the present embodiment will be described with reference to FIGS. 6A and 6B. As described with reference to FIGS. 3A to 3G the user can display a list of customization keys and currently assigned functions, and can customize the assignment according to his/her image capturing style and preference. However, as shown in FIG. 3G when customizing the M-Fn button 75 on the upper surface of the digital camera 100, the customization cannot be easily performed. Specifically, the orientation of the user when viewing the back-surface display unit 28 is such as shown in FIG. 6A, but the orientation of the user when checking the actual M-Fn button 75 provided on the upper surface is such as shown in FIG. 6B. Further, where the guidance of the customization key on the upper surface is displayed only on the back-surface display unit 28, it is necessary to perform a troublesome operation of changing the orientation between the orientation shown in FIG. 6A and the orientation shown in FIG. 6B. Therefore, in the present embodiment, a description will be given of a method of displaying a plurality of customization keys arranged on the upper surface and the back surface, so that the assignment can be checked while looking at the actual arrangement of the customization keys for each operation surface.

Figure 7:
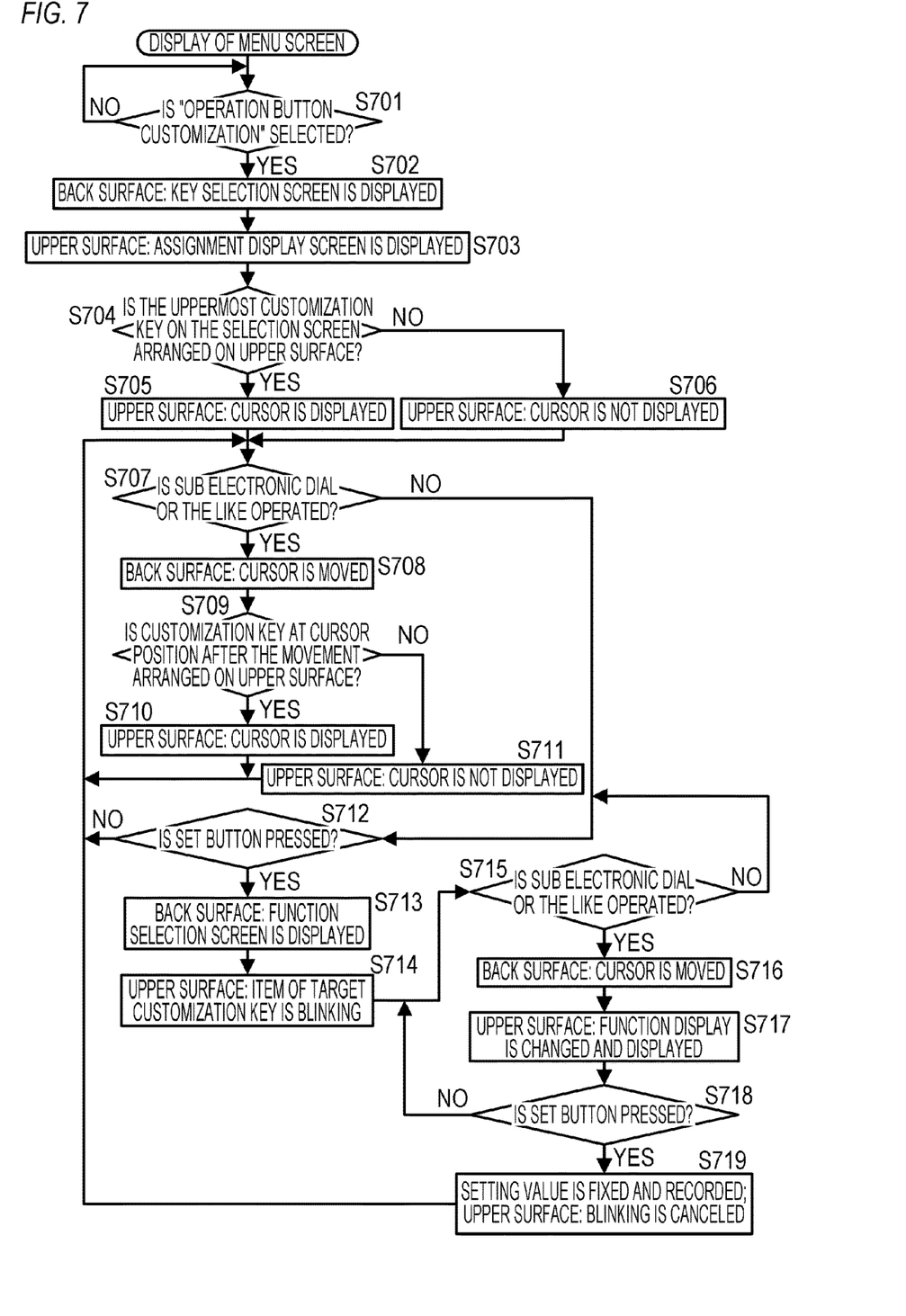
FIG. 7 is a flowchart of the digital camera according to the present embodiment.
Figures 8A, 8B:
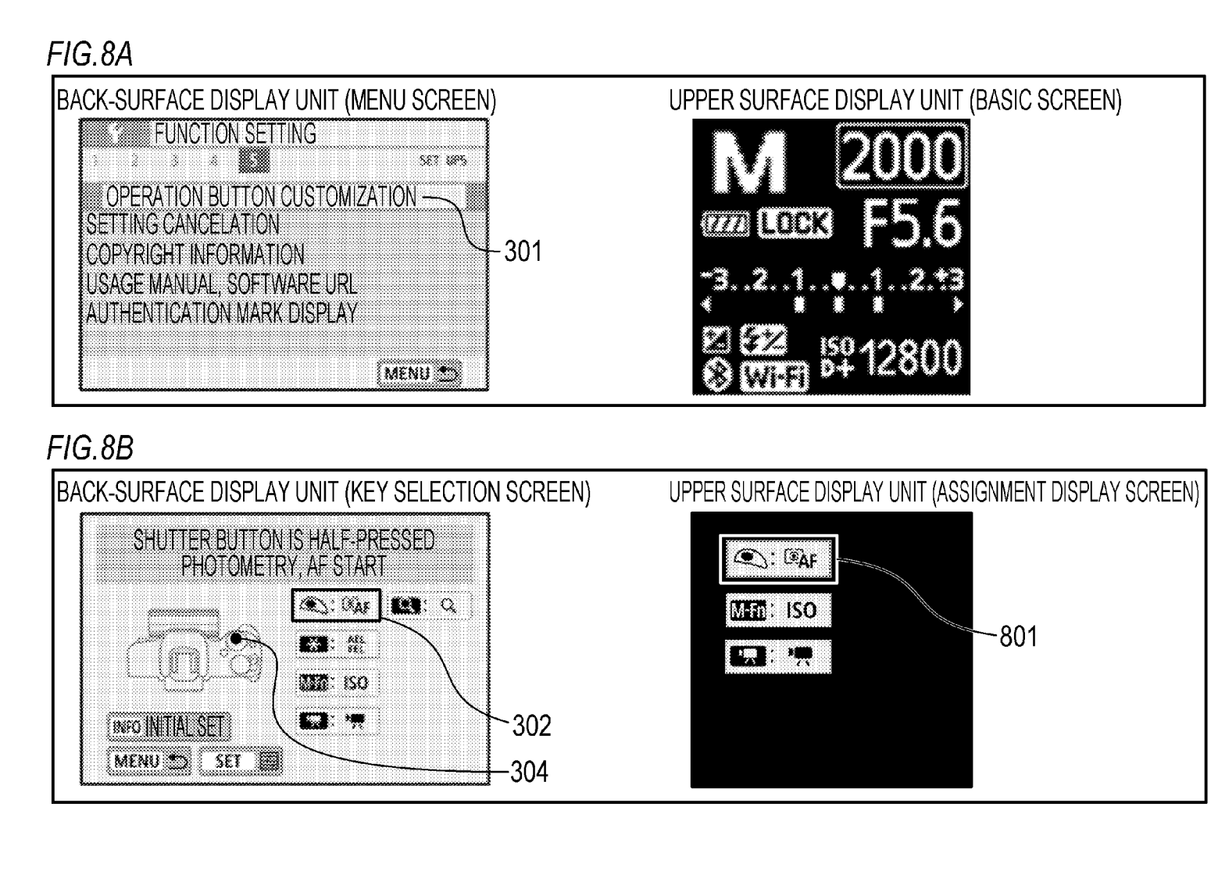
FIGS. 8A to 8F are screen examples of the digital camera according to the present embodiment.

Hereinafter, the operation of the digital camera 100 will be described with reference to FIGS. 7 and 8A to 8F. FIG. 7 is a flowchart of customization processing performed by the digital camera 100. Each process in this flowchart is realized by the system control unit 50 loading the program recorded in the nonvolatile memory 56 in the system memory 52 and executing the program. The flowchart in FIG. 7 starts from the menu display state. As shown in FIG. 8A, in the menu display state, the system control unit 50 causes a menu screen such as shown in FIG. 3A to be displayed on the back-surface display unit 28, and a basic screen such as shown in FIG. 5 to be displayed on the upper-surface display unit 43.

In step S701, the system control unit 50 determines whether or not a guide display instruction has been made, that is, whether the option "OPERATION BUTTON CUSTOMIZATION" has been selected. When the option "OPERATION BUTTON CUSTOMIZATION" has been selected, the processing proceeds to S702. Otherwise, the processing proceeds to S701.

In S702, in response to the fact that the option "OPERATION BUTTON CUSTOMIZATION" has been selected, the system control unit 50 causes the display screen of the back-surface display unit 28 to change from the menu screen in FIG. 8A to the key selection screen in FIG. 8B. As shown in FIG. 8B, on the key selection screen, a list of all the customization keys provided in the digital camera 100 and currently assigned functions is displayed. The cursor 302 is also displayed. In FIG. 8B, the cursor 302 corresponds to the uppermost item among a plurality of items (customization key options).

In S703, in response to the fact that the option "OPERATION BUTTON CUSTOMIZATION" has been selected, the system control unit 50 causes the display screen of the upper-surface display unit 43 to change from the basic screen in FIG. 8A to the assignment display screen in FIG. 8B. As shown in FIG. 8B, on the assignment display screen, a list of customization keys arranged on the upper surface and currently assigned functions is displayed. Customization keys arranged on a surface different from the upper face are not displayed. Also, an external view showing the position (arrangement) of the customization keys is not displayed.

In step S704, the system control unit 50 determines whether or not a customization key corresponding to the uppermost item among a plurality of items (customization key options), that is, a customization key selected by the cursor 302 on the key selection screen, is arranged on the upper surface. Where the customization key is arranged on the upper surface, the processing proceeds to S705. Otherwise, the processing proceeds to S706.

In step S705, the system control unit 50 displays a cursor 801 on the assignment display screen of the upper-surface display unit 43 in response to the fact that the customization key selected by the cursor 302 on the key selection screen is arranged on the upper surface. On the key selection screen in FIG. 8B, the first shutter switch 62 (the shutter button 61 is half-pressed) arranged on the upper surface is selected. Therefore, on the assignment display screen in FIG. 8B, the cursor 801 is displayed at the item corresponding to the first shutter switch 62 (the shutter button 61 is half-pressed). Thus, the user can easily recognize that the first shutter switch 62 (the shutter button 61 is half-pressed) is selected by the cursor 302 on the key selection screen.

In S706, the system control unit 50 does not display the cursor 801 on the assignment display screen of the upper-surface display unit 43 in response to the fact that the customization key selected by the cursor 302 on the key selection screen is not arranged on the upper surface.

In S707, the system control unit 50 determines whether or not there is a key selection instruction for selecting a customization key, that is, whether or not the sub electronic dial 73 or the four-direction key 74 has been operated. Where the sub electronic dial 73 or the four-direction key 74 has been operated, the processing proceeds to S708. Otherwise, the processing proceeds to S712.

Figure 8C:
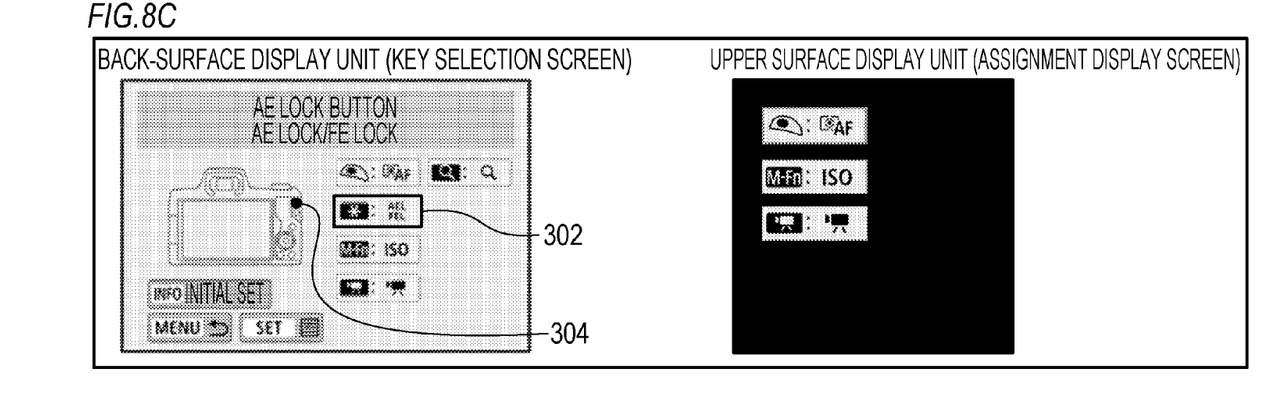

In S708, the system control unit 50 changes the position of the cursor 302 on the key selection screen in response to the operation of the sub electronic dial 73 or the four-direction key 74. For example, the display screen of the back-surface display unit 28 is changes from the key selection screen in FIG. 8B to the key selection screen in FIG. 8C.

In S709, in response to the fact that the sub electronic dial 73 or the four-direction key 74 has been operated, the system control unit 50 determines whether or not the customization key selected by the cursor 302 on the key selection screen is arranged on the upper surface. Where the cursor is arranged on the upper surface, the processing proceeds to S710. Otherwise, the processing proceeds to S711.

In S710, the system control unit 50 displays the cursor 801 on the assignment display screen of the upper-surface display unit 43 in response to the fact that the customization key selected by the cursor 302 on the key selection screen is arranged on the upper surface. The cursor 801 is displayed at the item of the customization key selected by the cursor 302 on the key selection screen. When the cursor 801 is displayed, the position of the cursor 801 is changed so that the cursor 801 is displayed at the item of the customization key selected by the cursor 302 on the key selection screen.

In S711, the system control unit 50 does not display the cursor 801 on the assignment display screen of the upper-surface display unit 43 in response to the fact that the customization key selected by the cursor 302 on the key selection screen is not arranged on the upper surface. When the cursor 801 has been displayed, the cursor 801 is deleted from the assignment display screen. For example, in the key selection screen in FIG. 8C, since the AE lock button 77 arranged on the back has been selected, the cursor 801 is not displayed on the assignment display screen in FIG. 8C. This makes it easy to identify that the customization key arranged on the upper surface has not been selected.

In S712, the system control unit 50 determines whether or not a target key determination instruction for determining a customization key (target customization key) that is the change target of the assigned function has been issued, that is, whether or not the SET button 79 has been pressed. Where the SET button 79 has been pressed, the processing proceeds to S713. Otherwise, the processing proceeds to S707.

Figure 8D:
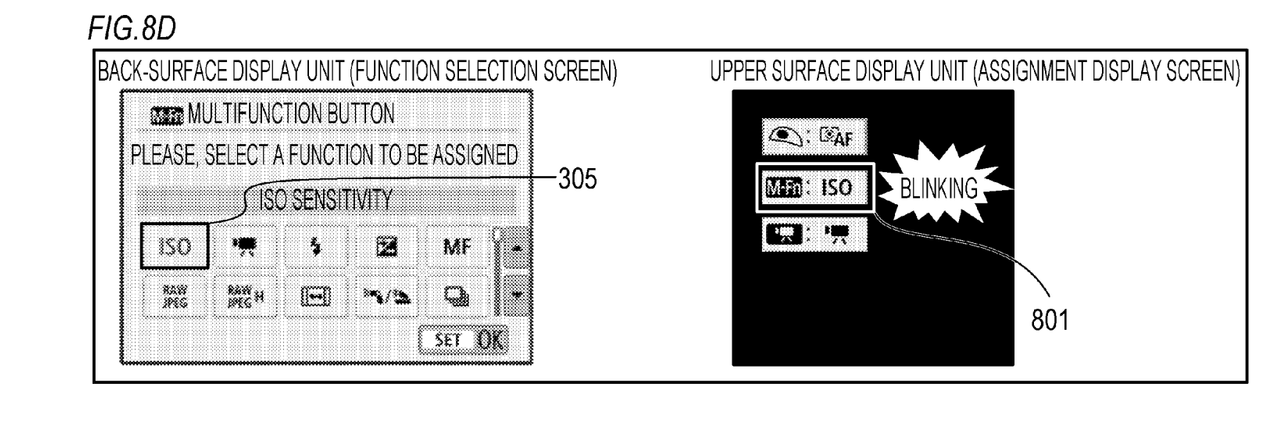

In S713, in response to the fact that the SET button 79 has been pressed, the system control unit 50 causes the display screen of the back-surface display unit 28 to change from the key selection screen to the function selection screen. On the function selection screen, a list of functions assignable to the target customization keys is displayed. A cursor 305 is also displayed. For example, when the M-Fn button 75 is determined as the target customization key, the display screen of the back-surface display unit 28 is changed from the key selection screen to the function selection screen in FIG. 8D, so that the list of functions assignable to the M-Fn button 75 is displayed on the back-surface display unit 28.

In S714, where the target customization key is arranged on the upper surface, the system control unit 50 blinks the item of the target customization key on the assignment display screen in response to the fact that the SET button 79 has been pressed. As a result, the user can easily identify on the assignment display screen of the upper-surface display unit 43 that the customization key arranged on the upper surface is determined as the target customization key. Since the M-Fn button 75 arranged on the upper surface has been determined as the target customization key on the function selection screen in FIG. 8D, the item corresponding to the M-Fn button 75 blinks on the assignment display screen in FIG. 8D.

In step S715, the system control unit 50 determines whether or not a function selection instruction for selecting a function which is wished to be assigned has been issued, that is, whether or not the sub electronic dial 73 or the four-direction key 74 has been operated. Where the sub electronic dial 73 or the four-direction key 74 has been operated, the processing proceeds to S716. Otherwise, the processing proceeds to S712.

Figure 8E:
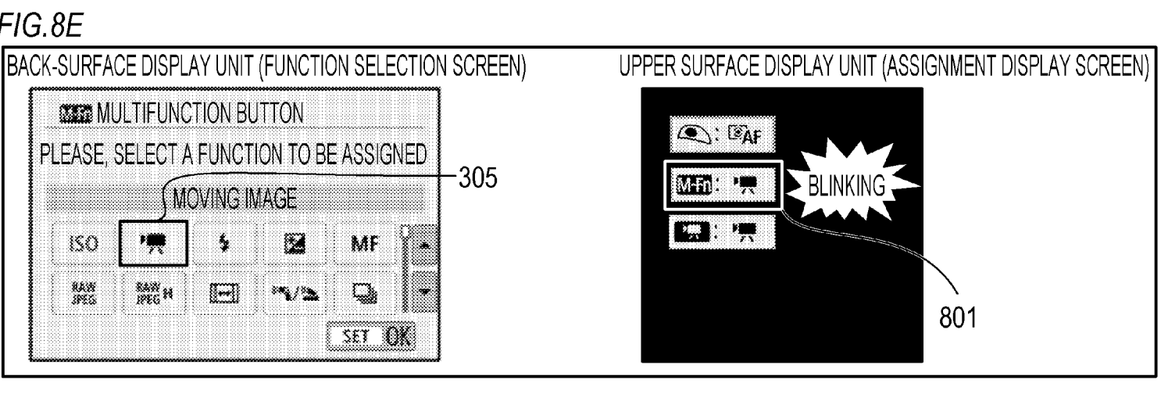

In S716, the system control unit 50 changes the position of the cursor 305 on the function selection screen in response to the fact that the sub electronic dial 73 or the four-direction key 74 has been operated. For example, the display screen of the back-surface display unit 28 is changed from the function selection screen in FIG. 8D to the function selection screen in FIG. 8E.

In S717, when the target customization key is arranged on the upper surface, the system control unit 50 changes the function represented by the item of the target customization key in response to the fact that the sub electronic dial 73 or the four-direction key 74 has been operated. For example, in the transition from the function selection screen in FIG. 8D to the function selection screen in FIG. 8E, the cursor 305 moves from the position of the ISO sensitivity function to the position of the moving image recording start/end function. For this reason, the display screen of the upper-surface display unit 43 is changed from the assignment display screen in FIG. 8D to the assignment display screen in FIG. 8E so that the function represented by the item of the target customization key on the assignment display screen changes from the ISO sensitivity function to the moving image recording start/end function screen.

In step S718, the system control unit 50 determines whether or not an assignment fixing instruction for fixing the assignment of function has been issued, that is, whether or not the SET button 79 has been pressed. Where the SET button 79 has been pressed, the processing proceeds to S719. Otherwise, the processing proceeds to S715.

Figure 8F:
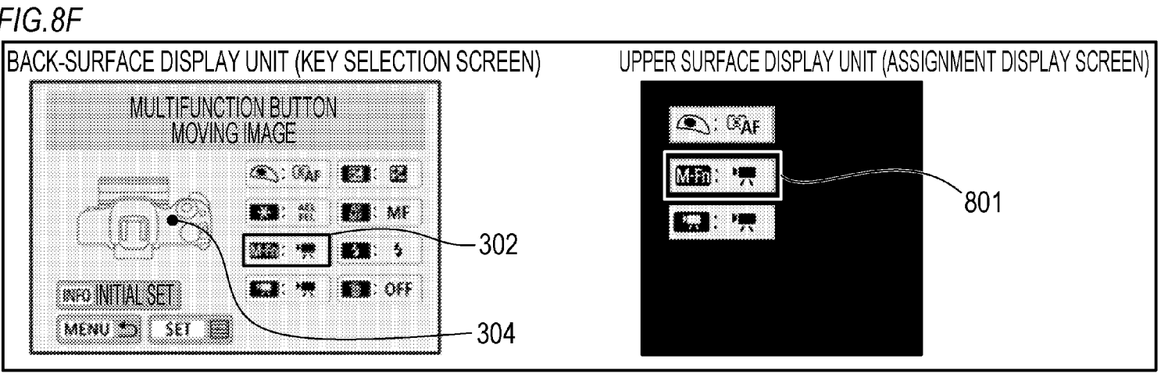

In step S719, the system control unit 50 fixes the setting value of the target customization key so that the function corresponding to the item selected by the cursor 305 is fixed as the function of the target customization key, and records (overwrites) the setting value in the nonvolatile memory 56. In addition, the system control unit 50 returns the display screen of the back-surface display unit 28 to the key selection screen, and releases (stops) the blinking display when the blinking display of S714 is being performed on the upper-surface display unit 43. For example, when the SET button 79 is pressed in the state shown in FIG. 8E, the display screen of the back-surface display unit 28 changes from the assignment display screen in FIG. 8E to the key selection screen in FIG. 8F. Then, the display screen of the upper-surface display unit 43 changes from the assignment display screen (blinking) in FIG. 8E to the assignment display screen (no blinking) in FIG. 8F.

With the above-described processing, the user can check the current assignment status of the customization key on the upper surface and the customization key currently selected by viewing the assignment display screen (upper-surface display unit 43) in FIG. 8B. That is, after the key selection screen is displayed, the user can check the abovementioned assignment status and customization key while maintaining the orientation in which the user looks at the upper surface as shown in FIG. 6B. Therefore, it is possible to check the assignment status of the function to the customization key on the upper surface without alternately repeating the orientation as shown in FIG. 6A and the orientation as shown in FIG. 6B. Further, when there is a customization key for which the function to be assigned is wished to be changed, it is possible to check, while looking at the upper surface (while looking at the actual customization button on the upper surface), whether or not the customization key can be selected.

Further, as shown in FIG. 6B, the operation on the operation unit 70 (in particular, the main electronic dial 71, the sub electronic dial 73, the SET button) can be performed while maintaining the orientation in which the user looks at the upper surface. Therefore, operations up to the selection operation of the customization key on the upper surface can be performed while looking at the upper surface. In addition, it is possible to display effectively the assignment status of the current customization key on the surface by using the limited display capability of the upper-surface display unit 43. Further, with respect to the customization keys provided on the back surface, the current assignment status of the customization key on the back surface and the customization key currently selected can be checked in the orientation in which the user looks at the back surface of the digital camera 100, this orientation being shown in FIG. 6A.

As described above, according to the present embodiment, with respect to a plurality of customization keys arranged on different surfaces of the apparatus, the assignment status is displayed, together with the actual customization keys, for each arranged operation surface so as to be easily viewable by the user. Therefore, the trouble of changing the orientation of the user looking at the apparatus when assigning a function to a customization key can be saved, and the customization can be performed smoothly and reliably.

Further, the abovementioned various kinds of control described as being performed by the system control unit 50 may be performed by one piece of hardware or may be shared between a plurality of pieces of hardware (for example, a plurality of processors and circuits) in order to control the entire apparatus.

Although the present invention has been described in detail with reference to the preferred embodiments thereof, the present invention is not limited to these specific embodiments, and the present invention is also inclusive of various embodiments that do not depart from the gist thereof. Furthermore, each of the above-described embodiments merely shows one embodiment of the present invention, and these embodiments can be combined as appropriate.

For example, the surface on which the customization keys and the display units are provided may be the side surface or the bottom surface of the apparatus, rather than the upper surface or the back surface of the apparatus. The resolution of the back-surface display unit 28, the number of display colors of the back-surface display unit 28, the resolution of the upper-surface display unit 43, and the number of display colors of the upper-surface display unit 43 are not particularly limited. The resolution of the back-surface display unit 28 may be equal to or lower than the resolution of the upper-surface display unit 43 or the number of display colors of the back-surface display unit 28 may be equal to or smaller than the number of display colors of the upper-surface display unit 43. The guide display instruction may be an instruction for starting the display indicating the function assigned to the customization key and may not be an instruction for starting a change of the function assigned to the customization key.

In the example explained hereinabove, both the function assigned to the customization key on the upper surface and the function assigned to the customization key on the back surface are shown on the key selection screen of the back-surface display unit 28, but this example is not limiting. For example, on the key selection screen, the function assigned to the customization key on the back surface may be shown without showing the function assigned to the customization key on the upper surface. In the example explained hereinabove, on the assignment display screen of the upper-surface display unit 43, the function assigned to the customization key on the upper surface is shown without showing the function assigned to the customization key on the back surface, but this example is not limiting. For example, on the assignment display screen, the function assigned to the customization key on the back surface may be shown in a manner different from the function assigned to the customization key on the upper surface.

In the example explained hereinabove, on the key selection screen of the back-surface display unit 28, the arrangement of the customization keys is shown by the external view, and on the assignment display screen of the upper-surface display unit 43, the arrangement of the customization keys is not shown, but this example is not limiting. The arrangement of the customization keys may be also shown on the assignment display screen. The manner of showing the arrangement of the customization keys is not particularly limited, and a method not using the external view may be used.

The method of identifying a specific customization key or function is not limited to a method using a cursor display or blinking display. For example, specific customization keys and functions may be made identifiable by displaying other items, changing the shape of items corresponding to a specific customization key, or the like. In the blinking display, the cursor may be blinking instead of the item, or both the item and the cursor may blink.

Further, in the above-described embodiment, the case where the present invention is applied to a digital camera (image capturing apparatus) has been described as an example, but this example is not limiting, and the present invention can be applied to any electronic apparatus having a plurality of customization keys on different surfaces. For example, the present invention is applicable to personal computers, PDAs, mobile phone terminals, portable image viewers, printer apparatuses, digital photo frames, music players, game machines, electronic book readers, video players, and the like. Further, the present invention is also applicable to display apparatuses (including projection apparatuses), tablet terminals, smartphones, AI speakers, household electronic apparatuses, in-vehicle apparatus, medical apparatuses, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electronic apparatus comprising:
   a first operation member provided on a first surface;
   a second operation member provided on a second surface;
   a first display provided on the first surface;
   a second display provided on the second surface; and
   a memory and at least one processor and/or at least one circuit to perform the operations of:
   a changing unit configured to change a function to be assigned to a operation member, to a function selected according to a user operation;
   a control unit configured to control so as to, in response to a display instruction to display a setting screen for changing the function to be assigned to the operation member to the function selected according to the user operation by the changing unit, cause the first display to perform display indicating at least a function assigned to the first operation member, and cause the second display to perform display indicating a function assigned to the second operation member,
   wherein the control unit controls so as to cause each of the first display and the second display provided on different surfaces to perform different displays indicating at least a function assigned to an operation member provided on the same surface as the surface on which each display is provided.

2. The electronic apparatus according to claim 1, wherein in response to the display instruction, the control unit controls so as to cause the first display to perform the display further indicating the function assigned to the second operation member.

3. The electronic apparatus according to claim 1, wherein in response to the display instruction, the control unit controls so as to cause the second display to perform the display that does not indicate the function assigned to the first operation member.

4. The electronic apparatus according to claim 1, wherein in response to the display instruction, the control unit controls so as to cause the first display to perform the display further indicating an arrangement of the operation members, and cause the second display to perform the display that does not indicate the arrangement of the operation members.

5. The electronic apparatus according to claim 1, wherein a resolution of the second display is lower than a resolution of the first display.

6. The electronic apparatus according to claim 1, wherein the first display is displayable three or more colors; and the second display is displayable only two colors.

7. The electronic apparatus according to claim 1, further comprising
   an image sensor, wherein
   the first display is a display provided on a back surface on a side opposite to an object to be imaged, and
   the second display is a display provided on an upper surface.

8. The electronic apparatus according to claim 1, wherein in response to the display instruction, the control unit performs control so as to cause the second display to perform a display indicating a plurality of functions respectively assigned to a plurality of second operation members; and
   in response to a selection instruction for selecting any one of the plurality of second operation members after the display instruction, the control unit controls the display of the second display so that the second operation member selected according to the selection instruction can be identified.

9. The electronic apparatus according to claim 8, wherein in response to a determination instruction for determining any one of the plurality of second operation members as a change target of the assigned function after the selection instruction, the control unit controls the display of the second display so that the second operation member determined as the change target according to the selection instruction becomes identifiable.

10. The electronic apparatus according to claim 1, wherein
the control unit controls so as to, in response to the display instruction, cause the first display to display an item indicating the function assigned to the first operation member and an item indicating the first operation member, and cause the second display to display an item indicating the function assigned to the second operation member and an item indicating the second operation member.

11. The electronic apparatus according to claim 1, wherein
the control unit controls so as to:
cause the second display to display information relating to image capturing settings, and
in response to the display instruction, change the display of the second display from the display of the information relating to the image capturing settings to the display indicating the function assigned to the second operation member.

12. A control method for an electronic apparatus, wherein the electronic apparatus includes:
a first operation member provided on a first surface;
a second operation member provided on a second surface;
a first display provided on the first surface; and
a second display provided on the second surface, and the control method includes:
changing a function to be assigned to a operation member, to a function selected according to a user operation
controlling so as to, in response to a display instruction to display a setting screen for changing the function to be assigned to the operation member to the function selected according to the user operation, cause the first display to perform display indicating at least a function assigned to the first operation member; and
controlling so as to, in response to the display instruction, cause the second display to perform display indicating a function assigned to the second operation member,
wherein it is controlled so as to cause each of the first display and the second display provided on different surfaces to perform different displays indicating at least a function assigned to an operation member provided on the same surface as the surface on which each display is provided.

13. A non-transitory computer readable medium that stores a program, wherein
the program causes a computer to execute a control method for an electronic apparatus,
the electronic apparatus includes:
a first operation member provided on a first surface;
a second operation member provided on a second surface;
a first display provided on the first surface; and
a second display provided on the second surface, and the control method includes:
changing a function to be assigned to a operation member, to a function selected according to a user operation
controlling so as to, in response to a display instruction to display a setting screen for changing the function to be assigned to the operation member to the function selected according to the user operation, cause the first display to perform display indicating at least a function assigned to the first operation member; and
controlling so as to, in response to the display instruction, cause the second display to perform display indicating a function assigned to the second operation member,
wherein it is controlled so as to cause each of the first display and the second display provided on different surfaces to perform different displays indicating at least a function assigned to an operation member provided on the same surface as the surface on which each display is provided.

* * * * *